UNITED STATES PATENT OFFICE.

MARY A. REAVES, OF SNELLING, CALIFORNIA.

COMPOUND FOR CATARRH.

SPECIFICATION forming part of Letters Patent No. 234,808, dated November 23, 1880.

Application filed May 3, 1880. (No specimens.)

*To all whom it may concern:*

Be it known that I, MARY A. REAVES, of Snelling, county of Merced, and State of California, have invented a Compound for the Treatment of Catarrh, Mucous, and Skin Diseases, and Baldness; and I hereby declare the following to be a full, clear, and exact description thereof.

My invention relates to a novel compound, which I employ for the treatment of diseases of the mucous membrane and skin, it being especially efficient for catarrh, scald-head, and diseases of the scalp, which cause a falling off of the hair.

It consists of a mixture of an infusion or extract of tobacco-leaves and a similar decoction or extract of the leaves of the wild mallard (*Malva borealis*) in certain proportions, the mixture being perfumed or scented to suit.

In the manufacture of my compound I take twelve ounces of pure natural leaf-tobacco and from two to four ounces of wild mallard. The tobacco-leaf is first cut or chopped fine, and warm water enough to cover it is poured over it, and allowed to stand for about twelve hours. The mallard-leaves are then placed in a vessel with sufficient water to cover them and make an infusion and boiled for one hour. The two are then mixed and stirred together, after which the leaves are pressed and the liquid is strained. Any suitable or desirable perfume may be added, after which the compound is bottled and sealed ready for use.

When it is to be used for the ordinary treatment or dressing of the scalp the proportion of mallard-leaves is two ounces to twelve of the tobacco; but when used for the treatment of severe cases of catarrh or skin disease the amount of the mallard is increased to four ounces.

Having thus described my invention, what I claim as new, and desire to secure by Letters Patent, is—

A compound consisting of an infusion of tobacco-leaves mixed with an infusion of the leaves of wild mallard (*Malva borealis*) in proportions substantially as herein described.

In witness whereof I have hereunto set my hand.

MARY A. REAVES.

Witnesses:
G. W. HALSTEAD, Sr.,
ELMYRA HALSTED.